US005833194A

United States Patent [19]

Jones et al.

[11] Patent Number: 5,833,194

[45] Date of Patent: Nov. 10, 1998

[54] ADJUSTABLE LOCKING DRINK HOLDER

[75] Inventors: Stephen W. Jones; Edward L. Heene; Michael D. Swan, all of Emporia, Kans.

[73] Assignee: Jasco, Inc., Emporia, Kans.

[21] Appl. No.: 881,534

[22] Filed: Jun. 24, 1997

[51] Int. Cl.$^{6}$ ........................ A47K 1/08

[52] U.S. Cl. ........................ 248/311.2; 224/926

[58] Field of Search ........................ 248/311.2, 309.1; 224/926, 281, 542, 539

[56] References Cited

U.S. PATENT DOCUMENTS

| | | | |
|---|---|---|---|
| 4,738,423 | 4/1988 | DiFilippo et al. | 248/311.2 |
| 4,779,831 | 10/1988 | Anderson | 248/311.2 |
| 4,896,858 | 1/1990 | Sokolski et al. | 248/311.2 |
| 5,445,350 | 8/1995 | Rigsby | 248/311.2 X |
| 5,505,417 | 4/1996 | Plocher | 224/926 X |
| 5,573,214 | 11/1996 | Jones et al. | 248/311.2 |

*Primary Examiner*—Ramon O. Ramirez
*Attorney, Agent, or Firm*—Hovey, Williams, Timmons & Collins

[57] ABSTRACT

A beverage container holder includes a holder body presenting a container well, an adjusting wall, a support strap and a spacer element. The adjusting wall is adjustably coupled with the holder body in spanning relationship with the well for selectively altering the span of the well in order to support and retain differently sized containers. In preferred forms, adjustment notches are defined in the top wall of the holder body on opposed sides of the well for receiving respective pins extending from the adjustable wall adjacent the opposed ends thereof. The spacer element is eccentrically and rotatable coupled with the bottom wall for selective adjustment of the spacing between the holder body and an upright support surface.

12 Claims, 2 Drawing Sheets

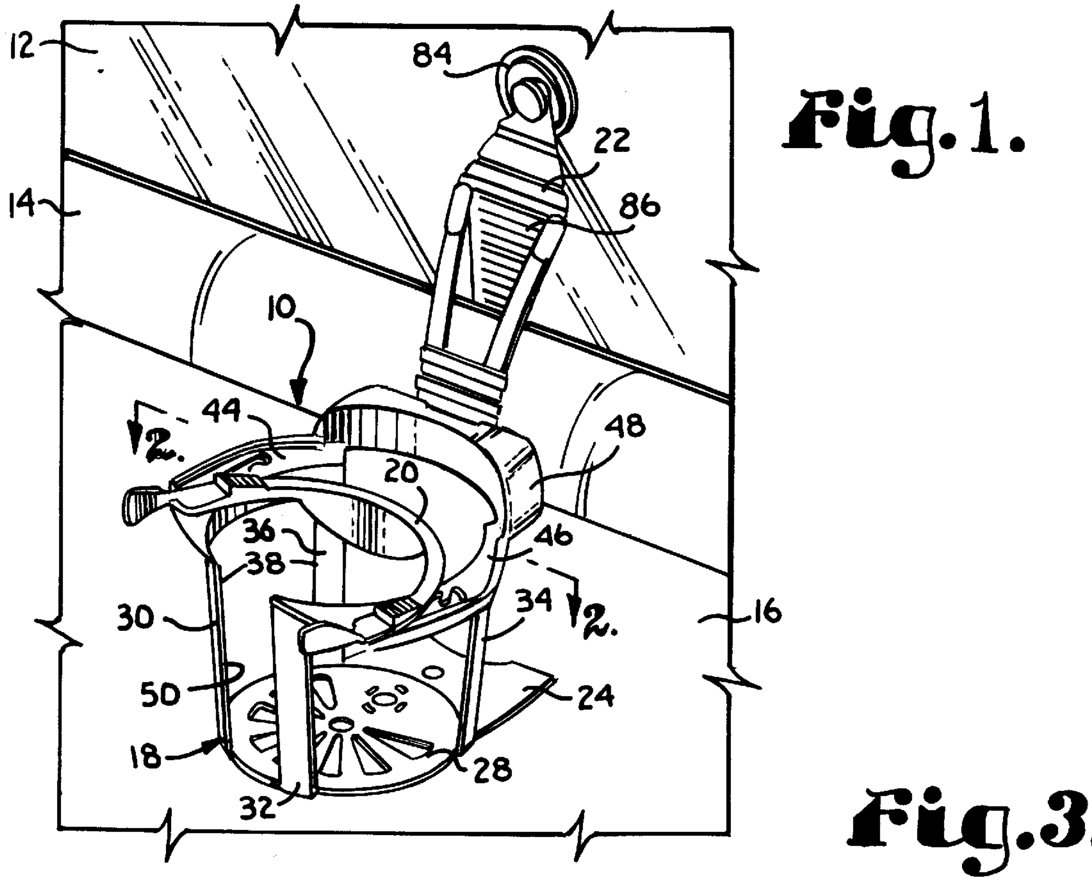
Fig. 1.
Fig. 2.
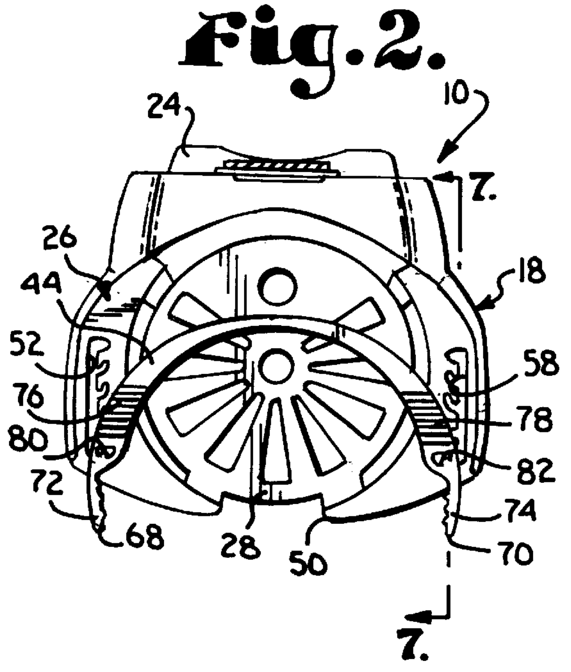
Fig. 3.
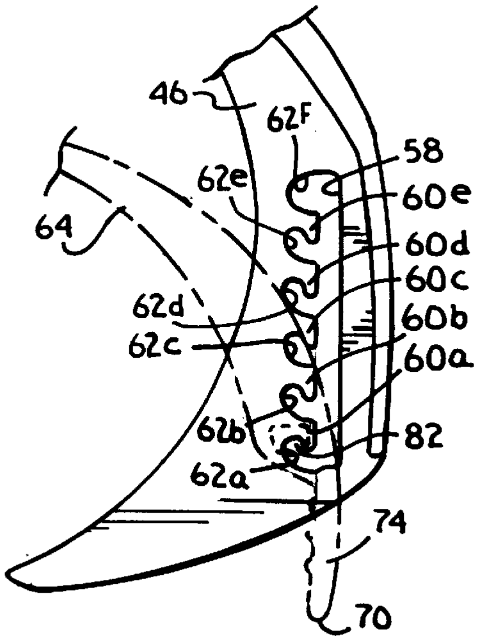

ADJUSTABLE LOCKING DRINK HOLDER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The present invention relates generally to the field of beverage container holders for vehicles. In particular, the invention is concerned with a beverage container holder including a holder body presenting a container well, an adjusting wall, a support strap and a spacer element wherein the adjusting wall is adjustably coupled with the holder body in spanning relationship with the well for selectively altering the span of the well in order to support and retain differently sized containers.

2. Description of the Prior Art

The prior art discloses a variety of beverage container holders for use in vehicles. Many do not present structure for adjusting the size of the container well. As a result, these types of holders cannot accommodate the larger containers and do not provide adequate support to smaller containers.

Other prior art holders disclose various techniques for adjusting the size of the container well. These include structure for shiftably coupling the side walls with the bottom wall or base. Other types include inwardly extending flexible fingers designed to conform to the shape of a beverage container and provide sufficient support. These and other prior art holders tend to be marginally effective in use or mechanically complex leading to increased manufacturing cost.

SUMMARY OF THE INVENTION

The present invention solves the prior art problems discussed above and provides a distinct advance in the state of the art. More particularly, the beverage container holder hereof is mechanically simple yet effective in supporting and retaining differently sized beverage containers.

The preferred embodiment of the present invention includes a holder body presenting a container well, an arcuate adjusting wall, a support strap and a spacer element. The holder body includes adjustment teeth defined in the top wall thereof on opposed sides of the well configured for selectively receiving in the notches therebetween respective pins depending from opposed ends of the adjustment wall. By shifting the pins to the notches, the adjusting wall can be shifted to a selected position in the well for adjusting the span of the well in order to accommodate the size of a selected beverage container.

In preferred forms, a spacer element is eccentrically and rotatably coupled with the bottom wall of the holder body. With the holder suspended by the support strap from a generally upright support surface, the spacer element can be rotated until it provides the needed spacing from an adjacent upright surface in order to present the bottom wall substantially level. Other preferred aspects of the present invention are disclosed herein.

BRIEF DESCRIPTION OF THE DRAWINGS

FIG. 1 is a perspective view of the preferred beverage container holder apparatus in accordance with the present invention shown in use suspended from the side window of a vehicle;

FIG. 2 is a sectional view taken along line 2—2 of FIG. 1;

FIG. 3 is an enlarged fragmentary plan view of a portion of the holder body of FIG. 2 with a portion of the adjusting wall shown in phantom lines in a first position;

DETAILED DESCRIPTION OF THE PREFERRED EMBODIMENT

Figure 4:
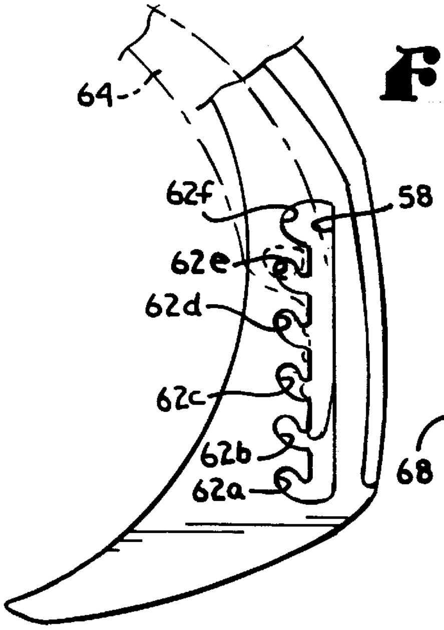
FIG. 4 is a view similar to FIG. 3 but showing the portion of the adjusting wall in the sixth position.

FIG. 1 illustrates preferred beverage holder apparatus 10 in accordance with the present invention in use suspended from the interior surface of side window 12 of a vehicle 14 and engaging the interior door panel 16 below window 12. Apparatus 10 broadly includes holder body 18, adjusting wall 20, support strap 22 and spacer element 24.

Holder body 18 is preferably composed of synthetic resin material and integrally includes C-shaped top wall 26, circular, apertured bottom wall 28 and spaced side walls 30, 32, 34, 36 extending therebetween. Walls 26–36 cooperatively define beverage container well 38 and are configured so that holder body 18 presents front side 40 and rear side 42. Top wall 26 includes arcuate left section 44, arcuate right section 46 positioned on the opposed side of well 38, and upraised rear section 48 interconnecting the rearward ends of left and right sections 44, 46 and defining the rearward side of holder body 18.

As best viewed in FIG. 1, side wall 30 extends between the forward end of left section 44 and bottom wall 28. Similarly, side wall 32 extends between the forward end of right section 46 and bottom wall 28. Spaced side walls 30 and 32 define gap 50 located at the front of well 38 and configured for allowing the ear of a cup to extend therethrough when the cup is received in well 38. Side walls 34, 36 also extend between sections 44, 46 respectively but adjacent and on opposed sides of rear section 48.

Referring also to the other drawing figures, left section 44 further includes structure defining left slot 52. Five adjustment teeth 54*a*, 54*b*, 54*c*, 54*d* and 54*e* extend into slot 52 respectively defining six, arcuate, rearwardly extending, adjustment notches 56*a*, 56*b*, 56*c*, 56*d*, 56*e* and 56*f*. Similarly, right section 46 includes structure defining right slot 58 with five adjustment teeth 60*a*, 60*b*, 60*c*, 60*d* and 60*e* extending therein defining six, arcuate, rearwardly extending, adjustment notches 62*a*, 62*b*, 62*c*, 62*d*, 62*e* and 62*f*. As explained further herein, notches 56*a–f* and 62*a–f* are configured to receive depending pins for selective positioning of adjustment wall 20.

Arcuate adjusting wall 20 is preferably composed of synthetic resin material and integrally includes wall strap 64 and depending wall portion 66. Wall portion 66 is positioned centrally relative to wall strap 64 and depends therefrom in order to extend into well 38. Wall strap 64 presents opposed, left and right ends 68 and 70, ridged, left and right handles 72 and 74 positioned adjacent respective ends 68, 70, and upstanding, ridged, left and right grippers 76 and 78 spaced respectively from handles 72, 74.

Figure 7:
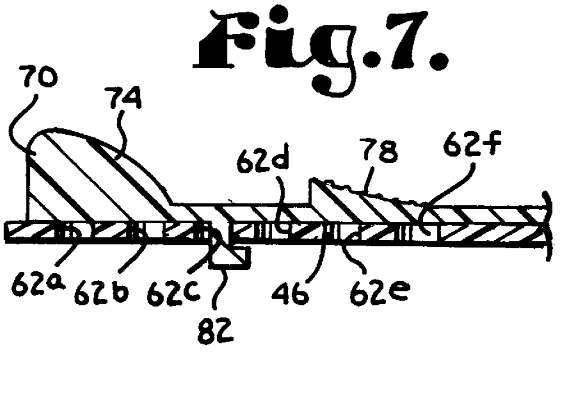
FIG. 7 is a partial sectional view taken along lines 7—7 of FIG. 2.

Left and right adjustment pins 80 and 82 extend downwardly from wall strap 64 adjacent ends 68, 70 and adjacent respective handles 72, 74. Pins 80, 82 are configured for reception in notches 56*a–f* and 62*a–f* respectively and present an L-shaped configured as best viewed in FIG. 7 to prevent inadvertent removal of pins 80, 82 from respective slots 52 and 58.

Support strap 22 is coupled with rear section 48 of top wall 46 and is preferably configured as illustrated in U.S. Pat. No. 5,573,214 incorporated herein by reference. Strap 22 is length adjustable relative to holder body 18 and includes suction cup 84 coupled adjacent the distal end thereof designed for attachment to a vehicle window in order to support holder body 18 in a depending relationship. Integral tongue 86 is configured to extend between a vehicle window and the window frame as shown in FIG. 1 for added support.

Spacer element 24 presents a generally rectangular configuration with rounded corners and is preferably composed of synthetic resin material. Pivot member 88 rotatably couples element 24 with bottom wall 28 adjacent the lower surface thereof. As illustrated in FIGS. 1 and 2, pivot member 88 is off-center relative to bottom wall 28 and near the rearward side of holder body 18 in order to eccentrically couple spacer element 24 with bottom wall 28. With this arrangement, spacer element 24 is rotatable between an extended position as illustrated in FIGS. 1–2 and 5–6 and a retracted position in which spacer element 24 is positioned within the area of bottom wall 28, with intermediate positions therebetween. Accordingly, spacer element 24 can be rotated to provide the spacing necessary against an adjacent upright surface for maintaining bottom wall 28 substantially level.

In use, apparatus 10 can be placed on any substantially level surface or mounted within the interior of a vehicle as the preferred environment of use. For the example illustrated in FIG. 1 for vehicle mounting, tongue 86 is inserted between the interior surface of a side window 12 and the window frame which extends from door panel 16. Suction cup 84 is then pressed against window 12. This places holder body in a depending relationship from support strap 22 with the length thereof adjusted as needed to place holder body 18 at the desired height. Next, spacer element 24 is rotated to engage door panel 16 and space holder body 18 therefrom. Continued rotation increases the spacing until bottom wall 28 presents a substantially level surface, such as the extended position illustrated in FIG. 1.

The next step is to position adjusting wall 20 as needed to accommodate the size of the beverage container to be received in apparatus 10. Well 38 presents a span thereacross between gap 50 and wall portion 66. Adjusting wall 20 is positioned as needed to adjust the well span in order to support a particular beverage container.

Figure 5:
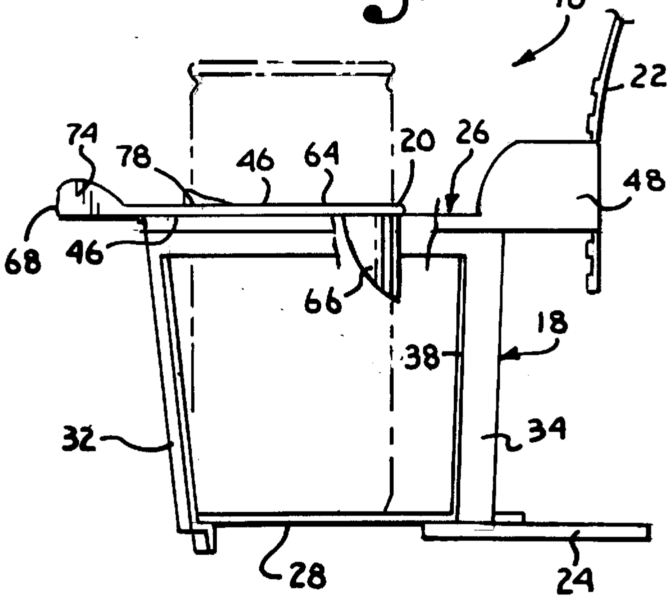
FIG. 5 is a side elevational view of the apparatus of FIG. 1 shown holding a beverage container such as a soda cap illustrated in phantom lines.

For example, FIG. 5 illustrates the first position for accommodating a typical soft drink can. In this position, left pin 80 is received in left notch 56*a* and right pin 82 is received in right notch 62*a*. This position presents the smallest well span. As noted above, notches 56*a–f* and 62*a–f* extend rearwardly and this helps ensure that a respective pin is locked in its notch while supporting a beverage container in well 38.

Figure 6:
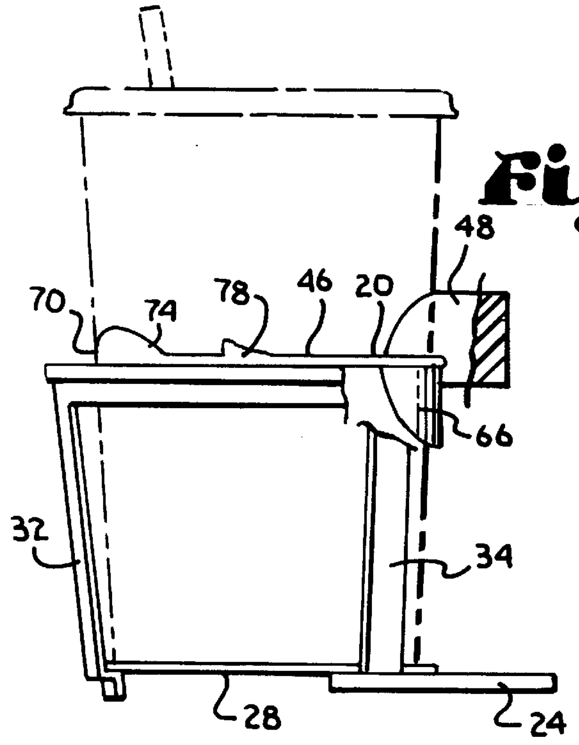
FIG. 6 is a side elevational view in partial section of the apparatus of FIG. 1 shown holding a larger beverage container illustrated in phantom lines.

In order to accommodate a larger beverage container, the user grasps left handle 72 and pushes leftwardly which removes left pin 80 from notch 56*a* and into left slot 52. While holding left handle 72 the user slides left pin 80 along slot 52 until the selected notch is reached such as notch 56*f* (as the sixth position) for a large beverage container such as illustrated in FIG. 6. The user then releases left handle 72. Adjusting wall 20 is resilient and configured for bias toward reception in a notch. The same procedure is repeated for the right side by grasping right handle 74, removing right pin 82 from notch 62*a*, sliding pin 82 along right slot 58 until notch 62*f* is reached whereupon right handle 74 is released and pin 82 slides into notch 62*f*.

The other notches allow positioning of wall 20 at intermediate positions. With six pairs of notches corresponding to six positions for wall 20, virtually any sized beverage container can be effectively supportive by apparatus 10. Moreover, this effectiveness if accomplished through the mechanical simplicity of apparatus 10. It will be noted that a total of thirty-six positions are available for wall 20 because each of the two pins can be positioned in any one of six notches.

In order to shift adjusting wall 20 to present a shorter well span for a smaller container, the procedure described above is repeated except that pins 80, 82 are moved forwardly along respective slots 52, 58. This procedure is aided by the thumb of the user's other hand engaging a respective gripper 76, 78 for shifting a pin to a selected location. As will be appreciated, if the beverage container presents an extension such as the ear of a coffee cup, the cup is positioned so that the ear extends through gap 50 with adjusting wall 20 positioned to engage the side wall of the cup.

Those skilled in the art will appreciate that the present invention encompasses many variations in the preferred embodiment described herein and having done so, the following is claimed as new and desired to be secured by Letters Patent:

1. A beverage container holder apparatus comprising:

a holder body including a top wall and a bottom wall with side walls therebetween cooperatively defining an open-top well configured for supporting and retaining a beverage container therein, said well presenting a span thereacross;

an adjusting wall; and coupling means for coupling said adjusting wall with said holder body in spanning relationship with said well and for selectively shifting said adjusting wall relative to said side walls for selectively adjusting said span of said well in order to support and retain therein a selected one of a plurality of differently sized beverage containers, said adjusting wall having opposed ends, said coupling means including means defining a plurality of side-by-side adjustment teeth and corresponding adjustment notches therebetween in said holder body extending in the direction generally parallel to said span, and a pin extending outwardly from one of said ends and configured for reception in selected one of said notches for selectively adjusting said span.

2. The apparatus as set forth in claim 1, said holder body and adjusting wall being composed of synthetic resin material.

3. The apparatus as set forth in claim 1, said adjustment teeth being a first set of adjustment teeth, said pin being a first pin, said coupling means further including means defining a second set of said adjustment teeth and notches in said holder adjacent said well and opposite said first set of teeth and notches, and a second pin extending outwardly adjacent the other of said ends configured for engaging a selected one of said second set of adjustment notches.

4. The apparatus as set forth in claim 3, said adjustment teeth being defined in said top wall, said pins extending downwardly.

5. The apparatus as set forth in claim 4, said adjusting wall including an arcuate wall strap presenting said ends and a depending arcuate wall section.

6. The apparatus as set forth in claim 5 further including means defining first and second slots adjacent said first and second sets of adjustment notches for selective movement of said pins through said respective slots between selected ones of said notches.

7. The apparatus as set forth in claim 6, said holder body presenting a rearward side, said apparatus further including an adjustable length support strap coupled with said rearward side of said holder body and having means for attaching to a generally upright support surface.

8. The apparatus as set forth in claim 7 further including a spacer element coupled with said holder and configured for spacing said holder body from the support surface, said spacer element being rotatably and eccentrically coupled with said bottom wall for selectively changing said spacing upon rotation of said element.

9. The apparatus as set forth in claim 8, said spacer element being rotatable between a minimum spacing position in which said element is substantially within the confines of the area of said bottom wall and a maximum spacing position in which said spacer element is positioned at its maximum extent from said rearward side with a plurality of intermediate positions therebetween.

10. The apparatus as set forth in claim 9, said holder body including a front side with an upright opening defined therein for allowing the ear of a cup received in said well to extend outwardly from said holder body.

11. A beverage container holder apparatus comprising:

a holder body including a top wall and a bottom wall with side walls therebetween cooperatively defining an open-top well configured for supporting and retaining a beverage container therein, said well presenting a span thereacross;

an adjusting wall; and coupling means for coupling said adjusting wall with said holder body in spanning relationship with said well and for selectively shifting said adjusting wall relative to said side walls for selectively adjusting said span of said well in order to support and retain therein a selected one of a plurality of differently sized beverage containers, said holder body presenting a rearward side, said apparatus further including an adjustable length support strap coupled with said rearward side of said holder body and having means for attaching to a generally upright support surface, said apparatus further including a spacer element coupled with said holder and configured for spacing said holder body from the support surface, said spacer element being rotatable and eccentrically coupled with said bottom wall for selectively changing said spacing upon rotation of said element, said spacer element being rotatable between a minimum spacing position in which said element is substantially within the confines of the area of said bottom wall and a maximum spacing position in which said spacer element is positioned at its maximum extent from said rearward side with a plurality of intermediate positions therebetween.

12. The apparatus as set forth in claim 11, said holder body including a front side with an upright opening defined therein for allowing the ear of a cup received in said well to extend outwardly from said holder body.

* * * * *